(12) United States Patent
Lee

(10) Patent No.: US 12,138,992 B2
(45) Date of Patent: Nov. 12, 2024

(54) AIR SUPPLY SYSTEMS FOR VEHICLES

(71) Applicants: Hyundai Motor Company, Seoul (KR); Kia Corporation, Seoul (KR)

(72) Inventor: Jong Geon Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 63 days.

(21) Appl. No.: 17/973,843

(22) Filed: Oct. 26, 2022

(65) Prior Publication Data

US 2023/0302878 A1   Sep. 28, 2023

(30) Foreign Application Priority Data

Mar. 28, 2022 (KR) .................. 10-2022-0038256

(51) Int. Cl.
*B60H 1/32* (2006.01)
*B60G 15/08* (2006.01)
*B60S 1/62* (2006.01)

(52) U.S. Cl.
CPC ........... *B60H 1/3233* (2013.01); *B60G 15/08* (2013.01); *B60H 1/3227* (2013.01); *B60S 1/62* (2013.01)

(58) Field of Classification Search
CPC .......................... B60H 1/3227; B60H 1/3233; B60H 1/00217; B60H 1/323; F25B 5/04
See application file for complete search history.

(56) References Cited

U.S. PATENT DOCUMENTS

| 4,365,663 A * | 12/1982 | Inoue ................. G05D 23/1925 165/43 |
| 2019/0024651 A1* | 1/2019 | Kotani ..................... F04B 41/06 |
| 2019/0263212 A1* | 8/2019 | Ito .......................... B01D 53/26 |
| 2021/0197119 A1* | 7/2021 | Vezil ..................... F25B 49/022 |

FOREIGN PATENT DOCUMENTS

KR    10-1735115 B1    5/2017

* cited by examiner

*Primary Examiner* — Marc E Norman
(74) *Attorney, Agent, or Firm* — Fish & Richardson P.C.

(57) ABSTRACT

An air supply system for a vehicle includes a first system including a first compressor compressing ambient air, a heat exchanger connected to the first compressor to allow compressed air to flow therethrough, and a first condenser connected to the heat exchanger. The air supply system further includes a second system including a second compressor compressing a refrigerant, a second condenser disposed at a rear end of the second compressor, an expansion valve disposed at a rear end of the second compressor, and an evaporator disposed at a rear end of the expansion valve. The second compressor, the second condenser, the expansion valve, and the evaporator of the second system are sequentially connected by a refrigerant flow line, and a refrigerant pipe disposed in the evaporator of the second system and connected to the refrigerant flow line is connected to a refrigerant pipe for a first condenser.

17 Claims, 8 Drawing Sheets

AIR SUPPLY SYSTEMS FOR VEHICLES

CROSS-REFERENCE TO RELATED APPLICATION(S)

This application claims benefit of priority to Korean Patent Application No. 10-2022-0038256 filed on Mar. 28, 2022, the disclosure of which is incorporated herein by reference in its entirety.

TECHNICAL FIELD

The present disclosure relates to air supply systems for vehicles.

BACKGROUND

Existing compressors for vehicles have generally been supplied in a package containing an adsorption-type air dryer with a simple structure or used without an air dryer.

As demand for suspension providing a higher level of comfort has increased and the development of advanced autonomous driving systems has progressed, a large number of compressors have increasingly been employed.

Yet, a pneumatic system including a compressor can be complicated, with many essential components necessary for establishing a stable system, and therefore, a pneumatic system including only minimal functional elements, rather than a stable system, has to be configured in a vehicle having a limited package layout.

In addition, moisture and condensate water in a compressor are factors that can hinder the durability and a normal operation of the pneumatic system, and in an industrial pneumatic system, it may be expensive to use dry air from which moisture is removed in a constant state as a working fluid.

However, in the case of an adsorption-type air dryer, two adsorbers can alternately operate because adsorption and regeneration processes of an adsorbent should be discontinuously and repeatedly performed in order to maintain drying performance of the compressor. In addition, in each regeneration process, a portion of a dried compressor can be bypassed and used, and then discharged to the atmosphere, which is a factor that can hinder the efficiency of the compressor.

SUMMARY

Exemplary implementations provide an air supply system for a vehicle that may contribute to durability, reliability, and performance improvement.

Exemplary implementations provide an air supply system for a vehicle in which components having the same principle of operation are shared and functionally integrated, while supplementing shortcomings of an adsorption-type air dryer (i.e., loss due to adsorption and regeneration processes of adsorption for maintaining drying performance of a compressor), to remove repeated elements, thereby reducing a weight of components, ensuring ease of packaging, and providing high-quality dry compressed air to a pneumatic system by removing moisture.

According to an aspect of the present disclosure, an air supply system for a vehicle includes a first system including a first compressor compressing ambient air, a heat exchanger connected to the first compressor to allow compressed air to flow therethrough, and a first condenser connected to the heat exchanger; as well as a second system including a second compressor compressing a refrigerant, a second condenser disposed at a rear end of the second compressor, an expansion valve disposed at a rear end of the second compressor, and an evaporator disposed at a rear end of the expansion valve, wherein the second compressor, the second condenser, the expansion valve and the evaporator of the second system are sequentially connected by a refrigerant flow line through which a refrigerant flows, and a refrigerant pipe for an evaporator disposed in the evaporator of the second system and connected to the refrigerant flow line is connected to a refrigerant pipe for a first condenser installed in the first condenser of the first system.

The refrigerant pipe for the evaporator may include a main refrigerant pipe connected to the refrigerant flow line and an auxiliary refrigerant pipe branched from the main refrigerant pipe and then reconnected to the main refrigerant pipe, wherein the main refrigerant pipe and the auxiliary refrigerant pipe may be connected by a 3-way valve for an evaporator.

The main refrigerant pipe and the refrigerant pipe for the first condenser may be connected by a 3-way valve for the first condenser.

One end of the refrigerant pipe for the first condenser may be connected to the main refrigerant pipe by the 3-way valve for the first condenser and the other end thereof may be connected to the refrigerant flow line.

The heat exchanger may include a first pipe portion connecting the receiving tank to the first condenser and a second pipe portion through which air discharged from the first condenser flows.

The second pipe portion may be disposed to pass through the first pipe portion.

A drain valve for discharging moisture condensed in the first condenser may be installed in the second pipe portion.

The air supply system may further include: a distributor connected to the first condenser, wherein the second pipe portion may connect the first condenser to the distributor.

The first system may be an air suspension system or an air sensor cleaning system.

The second system may be an air conditioning system for a vehicle.

The ambient air introduced into the evaporator may be provided to the interior of the vehicle after passing through the evaporator.

The first system may further include a receiving tank disposed between a rear end of the first compressor and the heat exchanger.

The second pipe portion may have a spiral shape disposed to surround an outer surface of the first pipe portion.

A cooling fin for improving heat transfer efficiency with the first pipe portion may be provided in the second pipe portion.

According to an aspect of the present disclosure, an air supply system for a vehicle includes a first system including a first compressor compressing ambient air, a heat exchanger connected to the first compressor to allow compressed air to flow therethrough, and a first condenser connected to the heat exchanger; and a second system including a second compressor compressing a refrigerant, a second condenser disposed at a rear end of the second compressor, an expansion valve disposed at a rear end of the second compressor, and an evaporator disposed at a rear end of the expansion valve, wherein the second compressor, the second condenser, the expansion valve and the evaporator of the second system are connected by a refrigerant flow line through which a refrigerant flows, and the refrigerant flowing through the refrigerant flow line and compressed air passing through the heat exchanger are heat-exchanged.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary implementations in the present disclosure will be described in detail with reference to the accompanying drawings.

Figure 1:
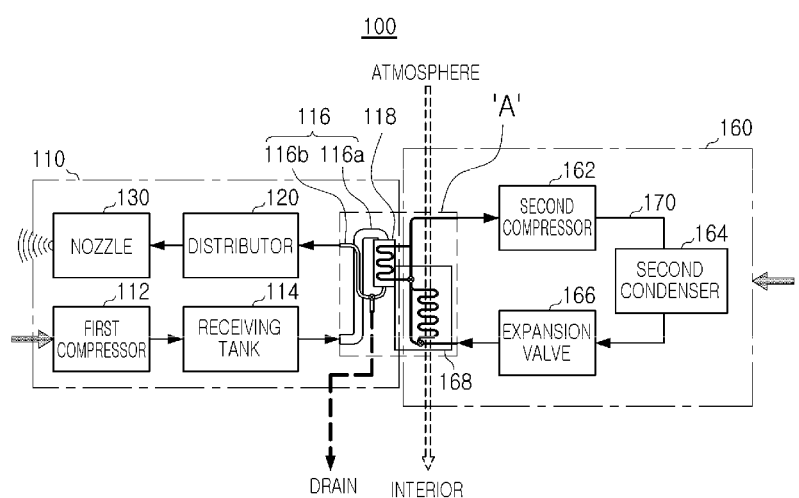
FIG. 1 is a configuration diagram illustrating an air supply system for a vehicle according to an exemplary implementation in the present disclosure.
Figure 2:
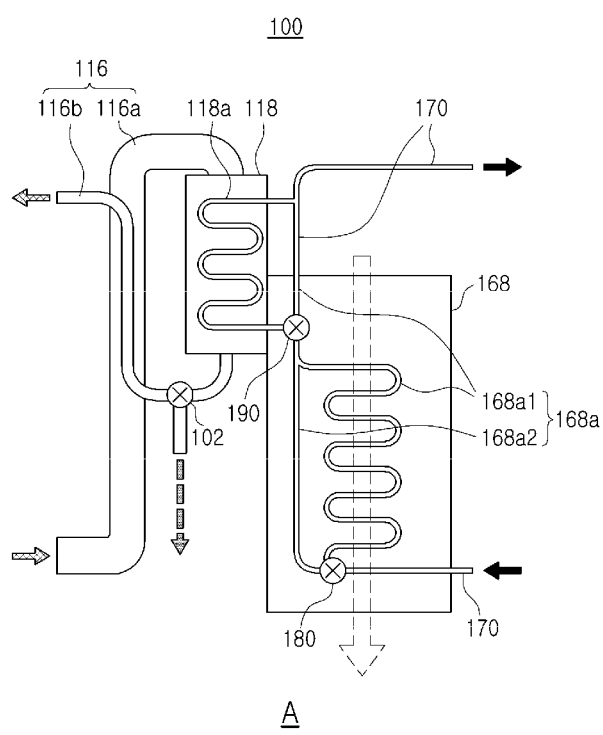
FIG. 2 is a cross-sectional view illustrating portion "A" of FIG. 1.

FIG. 1 is a configuration diagram illustrating an air supply system for a vehicle according to an exemplary implementation in the present disclosure, and FIG. 2 is a cross-sectional view illustrating portion "A" of FIG. 1.

Referring to FIGS. 1 and 2, an air supply system 100 for a vehicle according to an exemplary implementation in the present disclosure may include, as an example, a first system 110 and a second system 160.

The first system 110 is installed in a vehicle, and may be, for example, any one of a pneumatic system that provides air, such as an air suspension system and an air sensor cleaning system. As an example, the first system 110 may include a first compressor 112, a receiving tank 114, a heat exchanger 116, a first condenser 118, and a distributor 120.

The first compressor 112 serves to introduce and compress ambient air. As an example, an air filter may be provided at a front end of the first compressor 112, and the air filter removes foreign substances from the air introduced from the outside. Thereafter, the air from which foreign substances are removed is introduced into the first compressor 112 and compressed. Accordingly, the air discharged from the first compressor 112 becomes high-temperature, high-pressure compressed air.

The receiving tank 114 can temporarily store the compressed air from the first compressor 112. To this end, the receiving tank 114 may have an internal space having a predetermined size. In addition, the heat exchanger 116 may be connected to the receiving tank 114.

The heat exchanger 116 is connected to the first condenser 118 and is disposed to conduct heat transfer in the flowing air. As an example, the heat exchanger 116 may include a first pipe portion 116a connecting the receiving tank 114 and the first condenser 118 and a second pipe portion 116b connecting the first condenser 118 and the distributor 120 may be provided. In addition, the second pipe portion 116b may be disposed to pass through the first pipe portion 116a.

In other words, heat transfer may occur from air flowing along the first pipe portion 116a from the receiving tank 114 and flowing into the first condenser 118 to air discharged from the first condenser 118 and flowing along the second pipe portion 116b. Accordingly, the air discharged from the first condenser 118 may be reheated again, so that air with low humidity may be provided to the distributor 120 at a rear end. Accordingly, it can be possible to prevent or otherwise restrict condensate water from forming inside a pneumatic device disposed at a rear end of the distributor 120.

In some cases, the first condenser 118 may include a refrigerant pipe 118a for the first condenser connected to the second system 160. The refrigerant pipe 118a for the first condenser may have a plurality of bent portions to increase contact between introduced air and the refrigerant. Also, the first condenser 118 is connected to the heat exchanger 116. In some cases, the air introduced into the first condenser 118 exchanges heat with the refrigerant flowing through the refrigerant pipe 118a for the first condenser, and accordingly, a temperature of the air decreases to a dew point. Accordingly, moisture above a saturated water vapor amount at the dew point is condensed and the air is changed into dry air. Then, the condensed moisture descends by gravity and is finally discharged externally through a drain valve 102.

The distributor 120 is connected to the second pipe portion 116b and supplies dry air to a pneumatic device such as a nozzle 130 disposed at the rear end thereof. Accordingly, it can be possible to prevent otherwise restrict condensate water from forming on the pneumatic device such as the nozzle 130 disposed at the rear end. Accordingly, overall performance and reliability of the air supply system 100 for a vehicle can be improved.

The second system 160 can be installed in a vehicle and may be an air conditioning system for a vehicle. As an example, the second system 160 may include a second compressor 162, a second condenser 164, an expansion valve 166, and an evaporator 168. In some cases, the second compressor 162, the second condenser 164, the expansion valve 166, and the evaporator 168 are sequentially connected by the refrigerant flow line 170 through which the refrigerant flows. In other words, the refrigerant flows along the refrigerant flow line 170 and is circulated in the order of the second compressor 162, the second condenser 164, the expansion valve 166, and the evaporator 168.

The second compressor 162 adiabatically compresses the refrigerant to be changed in phase into high-temperature, superheated steam. Here, the second compressor 162 can make it easier to liquefy the refrigerant at room temperature.

The second condenser 164 can be disposed at a rear end of the second compressor 162, and a temperature of the refrigerant passing through the second condenser 164 is lowered through heat exchange with the introduced air. Here, the refrigerant changes from a gas to a liquid. That is, the second condenser 164 may be a radiator installed in a vehicle.

The expansion valve 166 can be disposed at a rear end of the second condenser 164, and the refrigerant passing through the expansion valve 166 is phase-changed into a low-temperature, low-pressure refrigerant while expanding. Here, the expansion valve 166 makes the refrigerant liquid easy to evaporate.

The evaporator 168 can be disposed at a rear end of the expansion valve 166, and the refrigerant passing through the evaporator 168 is phase-changed into saturated steam, while absorbing heat. Here, the refrigerant exchanges heat with ambient air flowing into the evaporator 168, and air having a lowered temperature is supplied to the interior of the vehicle. Then, the refrigerant changes from a liquid to a gas.

In some implementations, the evaporator 168 may include a refrigerant pipe 168a for an evaporator connected to the refrigerant flow line 170. As an example, the refrigerant pipe 168a for an evaporator may include a main pipe 168a1 connected to the refrigerant flow line 170 and an auxiliary refrigerant pipe 168a2 connected to the main refrigerant pipe 168a1 and connected to the refrigerant pipe 118a for the first condenser. In some cases, both ends of the auxiliary refrigerant pipe 168a2 may be connected to the main refrigerant pipe 168a1. In other words, the auxiliary refrigerant pipe 168a2 may be branched from the main refrigerant pipe 168a1 and then reconnected to the main refrigerant pipe 168a1 from the rear end. That is, the auxiliary refrigerant pipe 168a2 refers to a refrigerant pipe disposed between a portion connected to a 3-way valve 180 for an evaporator and a portion connected to the main refrigerant pipe 168a1 at a front end of a 3-way valve 190 for the first condenser.

In addition, the main refrigerant pipe 168a1 may have a plurality of bent portions to increase a contact area with ambient air flowing into the evaporator 168. In addition, the main refrigerant pipe 168a1 and the auxiliary refrigerant pipe 168a2 may be connected by a 3-way valve 180 for an evaporator. The 3-way valve 180 for an evaporator serves to allow the refrigerant to flow into any one of the main refrigerant pipe 168a1 and the auxiliary refrigerant pipe 168a2.

In some implementations, the refrigerant pipe 118a for the first condenser may be connected to the main refrigerant pipe 168a1, the refrigerant pipe 118a for the first condenser and the main refrigerant pipe 168a1 disposed at the rear end of the first 3-way valve 190 for the first condenser may be connected by the 3-way valve 190 for the first condenser.

Figure 3:
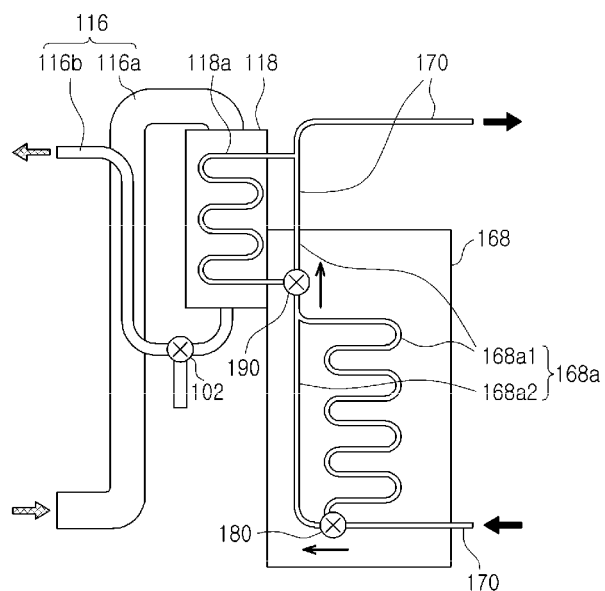
FIGS. 3 to 6 are illustrative views illustrating an operation of an air supply system for a vehicle according to an exemplary implementation in the present disclosure.
Figure 4:
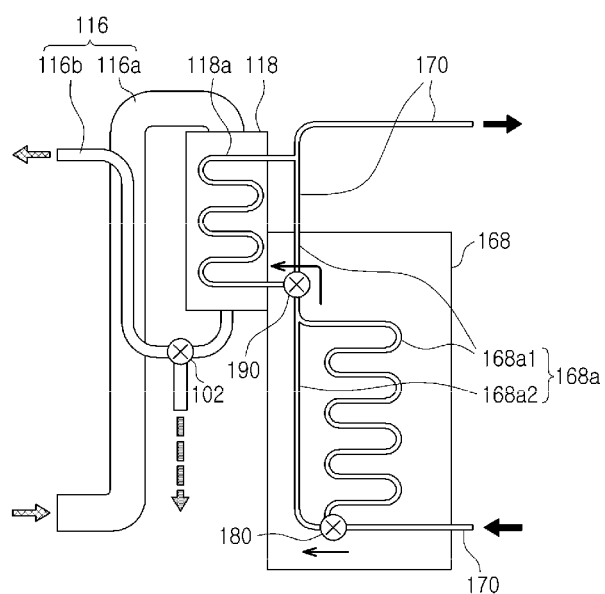

Here, referring to a flow path of the refrigerant in the second system 160, when both the first system 110 providing compressed air and the second system 160, an air conditioning system for a vehicle, do not operate, the 3-way valve 180 for an evaporator opens the auxiliary refrigerant pipe 168a2 side and closes the main refrigerant pipe 168a1 side so that the refrigerant may flow to the auxiliary refrigerant pipe 168a2 side, as shown in FIG. 3. Also, the 3-way valve 190 for the first condenser closes the refrigerant pipe 118a for the first condenser and opens the main refrigerant pipe 168a1 side so that the refrigerant may not flow to the refrigerant pipe 118a for the first condenser. Accordingly, the refrigerant flows into the main refrigerant pipe 168a1 and then flows along the auxiliary refrigerant pipe 168a2 and then along the main refrigerant pipe 168a1 disposed at the rear end of the 3-way valve 190 for the first condenser to finally flow into the refrigerant flow line 170.

In some implementations, when the first system 110 for providing compressed air operates and the second system 160, which is an air conditioning system for a vehicle, does not operate, the 3-way valve 180 for an evaporator opens the auxiliary refrigerant pipe 168a2 side and closes the main refrigerant pipe 168a1 so that the refrigerant may flow toward the auxiliary refrigerant pipe 168a2. Also, the 3-way valve 190 for the first condenser opens the refrigerant pipe 118a side for the first condenser and closes the main refrigerant pipe 168a1 side disposed at the rear end of the 3-way valve for the first condenser so that the refrigerant flows toward the refrigerant pipe 118a for the first condenser. Accordingly, the refrigerant may flow into the main refrigerant pipe 168a1, flow along the auxiliary refrigerant pipe 168a2, then flow along the refrigerant pipe 118a for the first condenser, and finally flow to the refrigerant flow line 170. In some cases, the air introduced into the first condenser 118 exchanges heat with the refrigerant flowing through the refrigerant pipe 118a for the first condenser, and accordingly, a temperature of the air decreases to the dew point. Accordingly, moisture above the saturated water vapor amount at the dew point is condensed and the air is changed to dry air. Then, the condensed moisture descends by gravity and is finally discharged externally through the drain valve 102.

Figure 5:
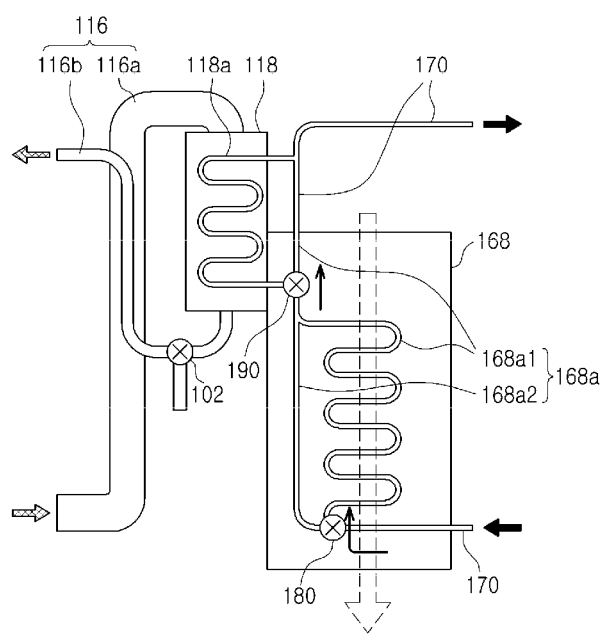

Also, when the first system 110 providing compressed air does not operate and the second system 160, which is an air conditioning system for a vehicle operates, the 3-way valve 180 for an evaporator closes the auxiliary refrigerant pipe 168a2 side and opens the main refrigerant pipe 168a1 side so that the refrigerant does not flow toward the auxiliary refrigerant pipe 168a2 but flows toward the main refrigerant pipe 168a1, as illustrated in FIG. 5. Also, the 3-way valve 190 for the first condenser closes the refrigerant pipe 118a side for the first condenser and opens the main refrigerant pipe 168a1 side disposed at the rear end of the 3-way valve 190 for the first condenser so that the refrigerant does not flow toward the refrigerant pipe 118a for the first condenser. Accordingly, after the refrigerant flows into the main refrigerant pipe 168a1, the refrigerant may only flow along the main refrigerant pipe 168a1 and then finally flow into the refrigerant flow line 170. In some cases, the air introduced into the evaporator 168 may exchange heat with the refrigerant flowing along the main refrigerant pipe 168a1, and accordingly, a temperature of the air decreases. Accordingly, cold air may be provided to the interior of the vehicle.

Figure 6:
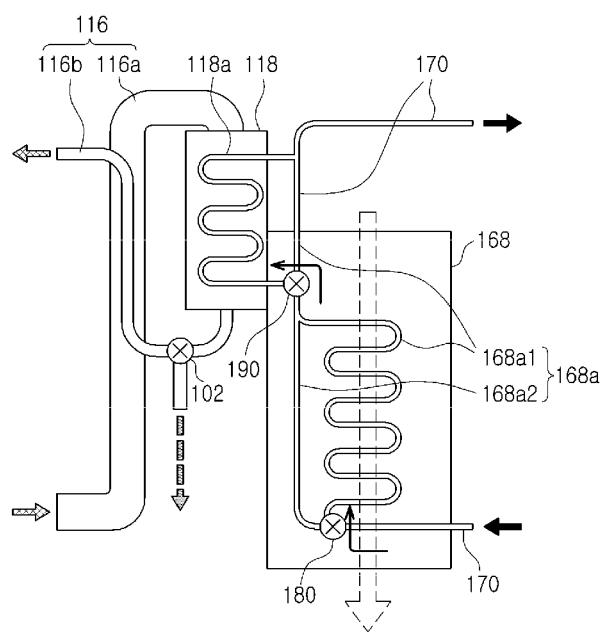

In addition, when both the first system 110 providing compressed air and the second system 160, which is an air conditioning system for a vehicle, operate, the 3-way valve 180 for an evaporator closes the auxiliary refrigerant pipe 168a2 side and opens the main refrigerant pipe 168a1 side so that the refrigerant may not flow toward the auxiliary refrigerant pipe 168a2 but flows toward the main refrigerant pipe 168a1, as illustrated in FIG. 6. Also, the 3-way valve 190 for the first condenser opens the refrigerant pipe 118a for the first condenser and closes the main refrigerant pipe 168a1 side disposed at the rear end of the 3-way valve 190 for the first condenser so that the refrigerant may flow toward the refrigerant pipe 118a for the first condenser. Accordingly, after the refrigerant flows into the main refrigerant pipe 168a1, the refrigerant flows along the main refrigerant pipe 168a1. Thereafter, the refrigerant may flow along the refrigerant pipe 118a for the first condenser and finally flow to the refrigerant flow line 170.

In some implementations, the air introduced into the evaporator 168 exchanges heat with the refrigerant flowing along the main refrigerant pipe 168a1, and accordingly, a temperature of the air decreases. Accordingly, cold air may be provided to the interior of the vehicle. In addition, the air introduced into the first condenser 118 exchanges heat with the refrigerant flowing through the refrigerant pipe 118a for the first condenser, and accordingly, a temperature of the air decreases to the dew point. Accordingly, moisture above the saturated water vapor amount at the dew point is condensed and the air is changed to dry air. Also, the condensed moisture can descend by gravity and finally discharged externally through the drain valve 102.

As described above, since the refrigerant of the second system 160 is configured to transfer heat with the air of the first system 110, it may contribute to the durability, reliability, and performance of the air supply system 100 for a vehicle. In other words, as the refrigerant of the second system 160 is disposed to pass through the inside of the first condenser 118 of the first system 110, the refrigerant is heat-exchanged with the air flowing through the first system 110. Accordingly, air having relatively low humidity is provided to the component (e.g., the nozzle 130) disposed at the rear end of the heat exchanger 116 of the first system 110, so that it can be possible to prevent or otherwise restrict condensate water from condensing inside the component (e.g., the nozzle 130) disposed at the rear end of the heat exchanger 116. Accordingly, the overall performance and reliability of the air supply system 100 for a vehicle can be improved.

In addition, the air supply system for a vehicle in which components having the same principle of operation are shared and functionally integrated, while supplementing shortcomings of an adsorption-type air dryer (i.e., loss due to adsorption and regeneration processes of an adsorption for maintaining drying performance of a compressor), to remove repeated elements, thereby reducing a weight of components, ensuring ease of packaging, and providing high-quality dry compressed air to a pneumatic system by removing moisture, may be provided.

Figure 7:
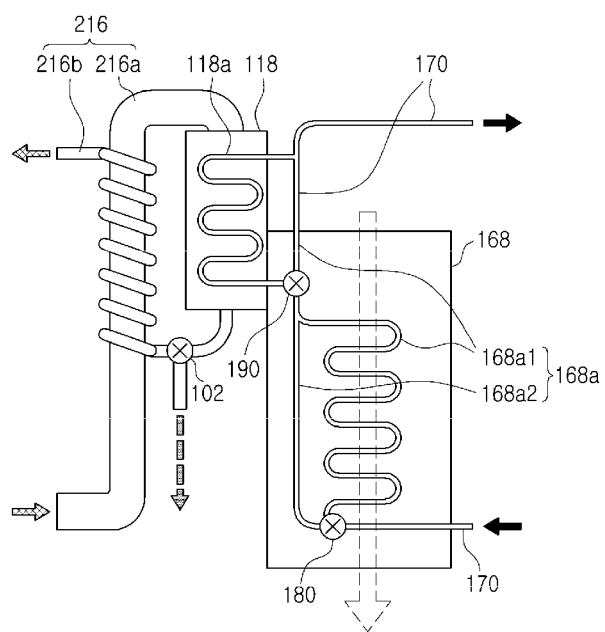
FIG. 7 is a configuration diagram illustrating another exemplary implementation of portion "A" of FIG. 1 of the air supply system for a vehicle according to an exemplary implementation in the present disclosure.

FIG. 7 is a configuration diagram illustrating a modified exemplary implementation of portion "A" of FIG. 1 of an air supply system for a vehicle according to an exemplary implementation in the present disclosure.

The same components as those described above are given the same reference numerals, and detailed descriptions thereof will be omitted and will be replaced with the above descriptions.

Referring to FIG. 7, the heat exchanger 216 is connected to the first condenser 118 and is disposed to perform heat transfer in flowing air. As an example, a heat exchanger 216 may include a first pipe portion 216a connecting the receiving tank 114 (see FIG. 1) to the first condenser 118 and a second pipe portion 216b connecting the first condenser 118 to the distributor 120 (see FIG. 1). In addition, the second pipe portion 216b may be disposed to surround an outer surface of the first pipe portion 216a. As an example, the second pipe portion 216b may have a spiral shape surrounding the first pipe portion 216a. In other words, heat transfer may be conducted from the air flowing along the first pipe portion 216a from the receiving tank 114 and flowing into the first condenser 118 to the air discharged from the first condenser 118 and flowing along the second pipe portion 216b. Accordingly, the air discharged from the first condenser 118 may be reheated again, so that the air having relatively low humidity may be provided to the distributor 120 at the rear end. Accordingly, it can be possible to prevent or otherwise restrict condensate water from forming inside the pneumatic device disposed at the rear end of the distributor 120.

Figure 8:
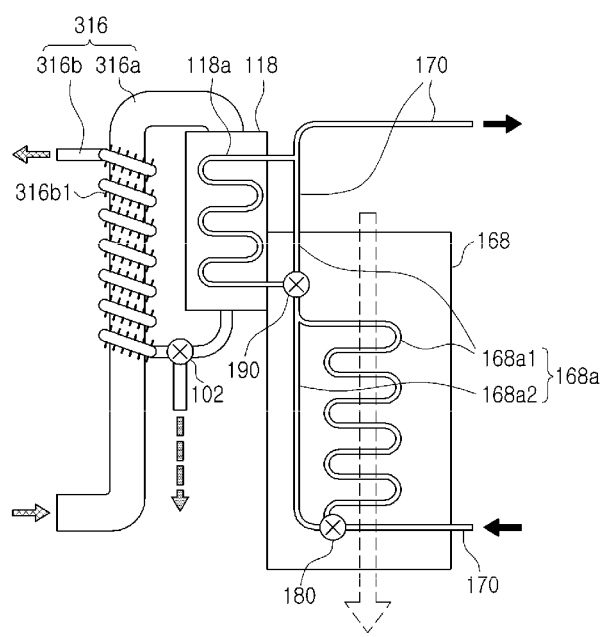
FIG. 8 is a configuration diagram illustrating another exemplary implementation of portion "A" of FIG. 1 of the air supply system for a vehicle according to an exemplary implementation in the present disclosure.

FIG. 8 is a configuration diagram illustrating a modified exemplary implementation of portion "A" of FIG. 1 of an air supply system for a vehicle according to an exemplary implementation in the present disclosure.

The same components as those described above are given the same reference numerals, and detailed descriptions thereof will be omitted and will be replaced with the above descriptions.

Referring to FIG. 8, a heat exchanger 316 is connected to the first condenser 118 and is disposed to perform heat transfer in flowing air. As an example, the heat exchanger 316 may include a first pipe portion 316a connecting the receiving tank 114 (see FIG. 1) to the first condenser 118 and a second pipe portion 316b connecting the first condenser 118 to the distributor 120 (see FIG. 1). In addition, the second pipe portion 316b may be disposed to surround an outer surface of the first pipe portion 316a. As an example, the second pipe portion 316b may have a spiral shape surrounding the first pipe portion 316a. In addition, the second pipe portion 316b may include a plurality of cooling fins 316b1 to improve heat transfer efficiency with the first pipe portion 316a. In other words, heat transfer may be conducted from the air flowing along the first pipe portion 316a from the receiving tank 114 and flowing into the first condenser 118 to the air discharged from the first condenser 118 and flowing along the second pipe portion 316b. Accordingly, the air discharged from the first condenser 118 may be reheated again, so that the air having relatively low humidity may be provided to the distributor 120 at the rear end. Accordingly, it can be possible to prevent or otherwise restrict condensate water from forming inside the pneumatic device disposed at the rear end of the distributor 120.

According to an exemplary implementation in the present disclosure, there can be an effect that contributes to the durability, reliability, and performance improvement.

In addition, an air supply system for a vehicle in which components having the same principle of operation are shared and functionally integrated, while potential supplementing shortcomings of an adsorption-type air dryer (i.e., loss due to adsorption and regeneration processes of an adsorption for maintaining drying performance of a compressor), to remove repeated elements, thereby reducing a weight of components, ensuring the ease of packaging, and providing high-quality dry compressed air to a pneumatic system by removing moisture, can be provided.

While example exemplary implementations have been illustrated and described above, it will be apparent to those skilled in the art that modifications and variations could be made without departing from the scope of the present disclosure as defined by the appended claims.

What is claimed is:

1. An air supply system for a vehicle, the air supply system comprising:
   a first system including:
      a first compressor configured to compress ambient air,
      a heat exchanger connected to the first compressor to allow compressed air to flow therethrough, and
      a first condenser connected to the heat exchanger; and
   a second system including:
      a second compressor configured to compress refrigerant,
      a second condenser disposed at a rear end of the second compressor,
      an expansion valve disposed at a rear end of the second compressor, and
      an evaporator disposed at a rear end of the expansion valve,
   wherein the second compressor, the second condenser, the expansion valve, and the evaporator of the second system are sequentially connected by a refrigerant flow line through which the refrigerant flows,
   wherein a first refrigerant pipe of the first condenser in the first system is connected to a second refrigerant pipe of the evaporator in the second system, the second refrigerant pipe being connected to the refrigerant flow line,
   wherein the second refrigerant pipe includes a main refrigerant pipe connected to the refrigerant flow line and an auxiliary refrigerant pipe branched from the main refrigerant pipe and then reconnected to the main refrigerant pipe, and
   wherein the main refrigerant pipe and the auxiliary refrigerant pipe are connected to each other by a 3-way valve of the evaporator.

2. The air supply system of claim 1, wherein the main refrigerant pipe and the first refrigerant pipe for the first condenser are connected by a 3-way valve of the first condenser.

3. The air supply system of claim 2, wherein one end of the first refrigerant pipe for the first condenser is connected to the main refrigerant pipe by the 3-way valve of the first condenser and the other end thereof is connected to the refrigerant flow line.

4. The air supply system of claim 1, wherein the first system further includes a receiving tank disposed between a rear end of the first compressor and the heat exchanger.

5. The air supply system of claim 4, wherein the heat exchanger includes a first pipe portion connecting the receiving tank to the first condenser and a second pipe portion through which air discharged from the first condenser flows.

6. The air supply system of claim 5, wherein the second pipe portion is disposed to pass through the first pipe portion.

7. The air supply system of claim 6, wherein a drain valve configured to discharge moisture condensed in the first condenser is provided in the second pipe portion.

8. The air supply system of claim 7, wherein the drain valve is disposed vertically below the first condenser.

9. The air supply system of claim 5, further comprising a distributor connected to the first condenser, wherein the second pipe portion connects the first condenser to the distributor.

10. The air supply system of claim 5, wherein the second pipe portion has a spiral shape that surrounds an outer surface of the first pipe portion.

11. The air supply system of claim 10, wherein a cooling fin configured to increase heat transfer efficiency with the first pipe portion is provided in the second pipe portion.

12. The air supply system of claim 1, wherein the first system is a pneumatic system.

13. The air supply system of claim 12, wherein the pneumatic system is at least one of an air suspension system or an air sensor cleaning system.

14. The air supply system of claim 1, wherein the second system is an air conditioning system for a vehicle.

15. The air supply system of claim 14, wherein air introduced into the evaporator is provided to an interior of the vehicle after passing through the evaporator.

16. An air supply system for a vehicle, the air supply system comprising:
a first system including a first compressor configured to compress ambient air, a heat exchanger connected to the first compressor to allow compressed air to flow therethrough, and a first condenser connected to the heat exchanger; and
a second system including a second compressor configured to compress refrigerant, a second condenser disposed at a rear end of the second compressor, an expansion valve disposed at a rear end of the second compressor, and an evaporator disposed at a rear end of the expansion valve,
wherein the second compressor, the second condenser, the expansion valve, and the evaporator of the second system are connected by a refrigerant flow line through which a refrigerant flows, and
wherein the refrigerant flowing through the refrigerant flow line and the compressed air passing through the heat exchanger are heat-exchanged with each other.

17. An air supply system for a vehicle, the air supply system comprising:
a first system including:
a first compressor configured to compress ambient air,
a heat exchanger connected to the first compressor to allow compressed air to flow therethrough, and
a first condenser connected to the heat exchanger; and
a second system including:
a second compressor configured to compress refrigerant,
a second condenser disposed at a rear end of the second compressor,
an expansion valve disposed at a rear end of the second compressor, and
an evaporator disposed at a rear end of the expansion valve,
wherein the second compressor, the second condenser, the expansion valve, and the evaporator of the second system are sequentially connected by a refrigerant flow line through which the refrigerant flows,
wherein a first refrigerant pipe of the first condenser in the first system is connected to a second refrigerant pipe of the evaporator in the second system, the second refrigerant pipe being connected to the refrigerant flow line,
wherein the first system further includes a receiving tank disposed between a rear end of the first compressor and the heat exchanger, and
wherein the heat exchanger includes a first pipe portion connecting the receiving tank to the first condenser and a second pipe portion through which air discharged from the first condenser flows.

* * * * *